March 16, 1965  R. W. BRITTEN  3,173,706
HARNESS RACING SULKY
Filed July 14, 1961  2 Sheets-Sheet 1
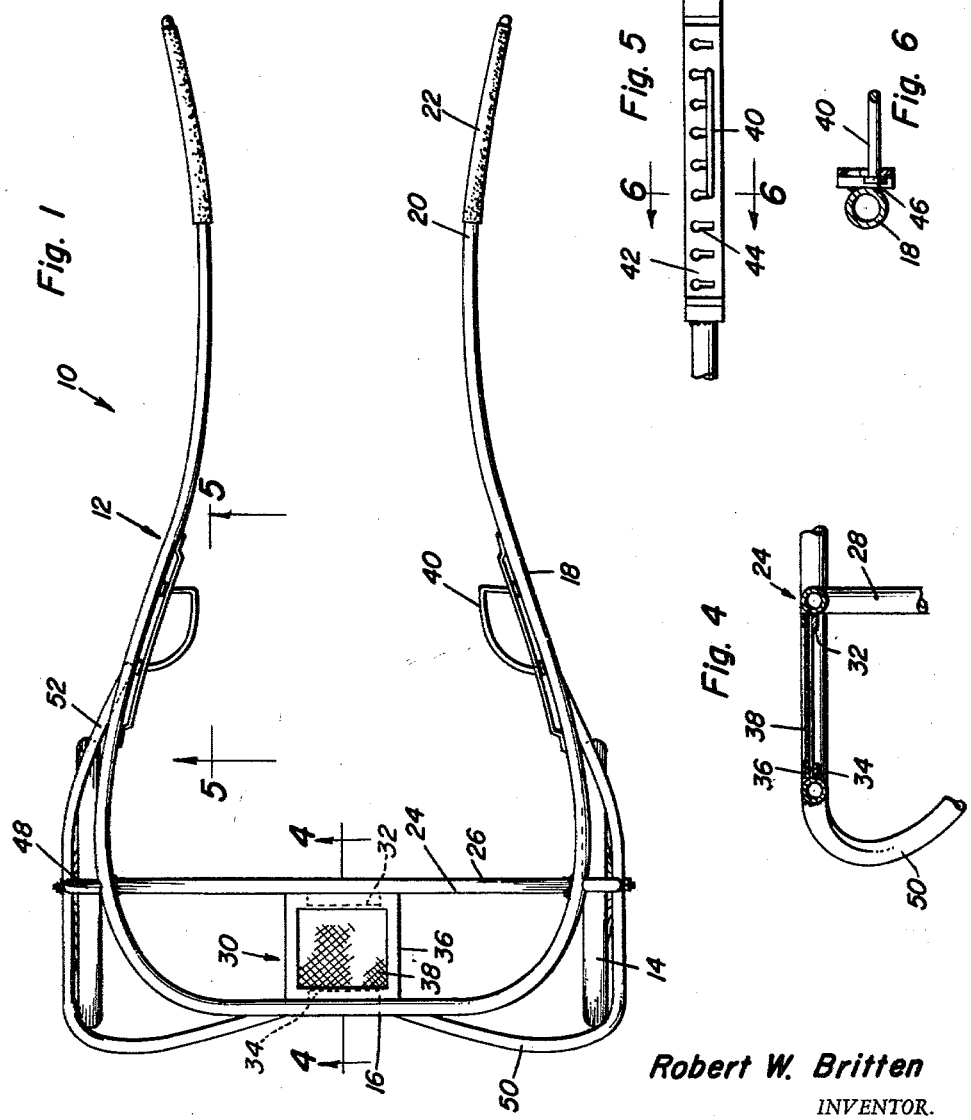
Robert W. Britten
INVENTOR.

March 16, 1965 R. W. BRITTEN 3,173,706
HARNESS RACING SULKY
Filed July 14, 1961 2 Sheets-Sheet 2
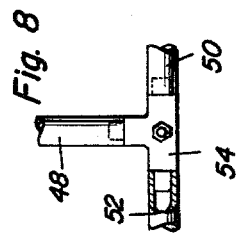
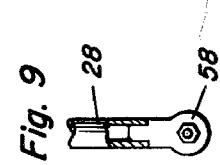
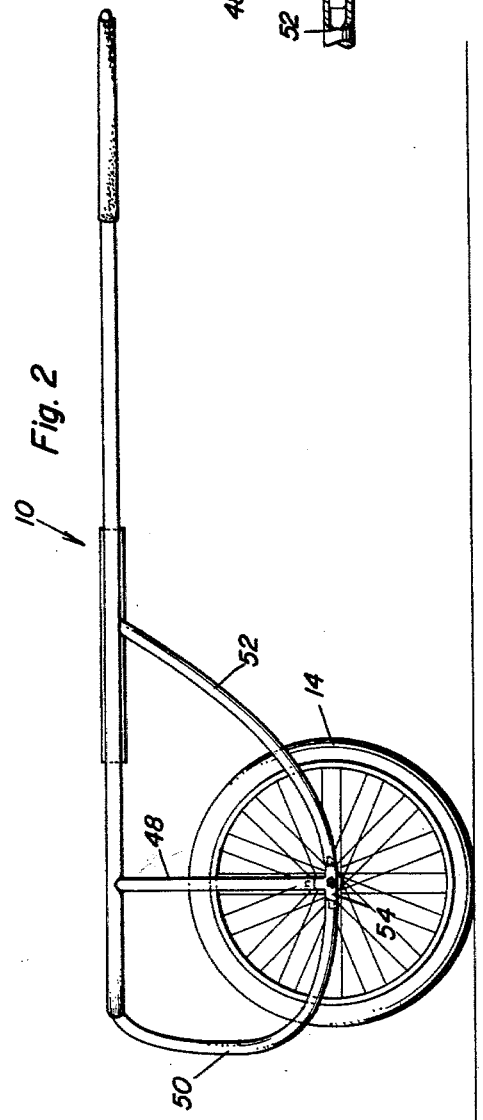
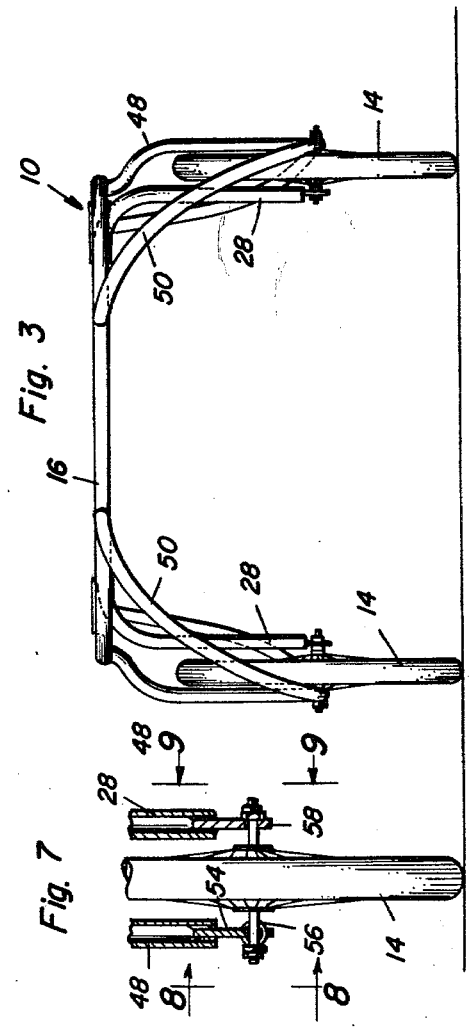
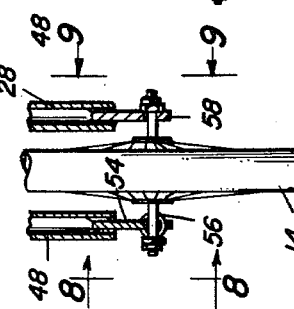
Robert W. Britten
INVENTOR.

3,173,706
HARNESS RACING SULKY
Robert W. Britten, Rte. 2, 2110 W. Beard Road, Perry, Mich.
Filed July 14, 1961, Ser. No. 124,151
2 Claims. (Cl. 280—63)

This invention relates to a racing sulky construction which is novel and useful.

The sulky construction of the present invention is designed to avoid damage to the wheels thereof by the hoof of horses approaching the sulky during a race. Accordingly, a primary object of this invention is to provide a sulky including a novel protective feature for the wheels thereof which tend to deflect the hoof of any approaching horse that would otherwise cause damage to the sulky wheels.

Another object of this invention is to provide a racing sulky having a novel supporting structure for the wheels for more rigid support thereof relative to the main portion of the sulky frame and also providing protection for the sulky wheels on the outside thereof.

A still further object of this invention is to provide a sulky, the construction of which is simple but efficient and capable of being adjustably assembled with ease.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the racing sulky of the present invention.

FIGURE 2 is a side elevational view of the sulky.

FIGURE 3 is a rear elevational view of the sulky.

FIGURE 4 is a partial sectional view taken substantially through a plane indicated by section line 4—4 in FIGURE 1.

FIGURE 5 is a view of the adjustable stirrup mounting as seen through the plane indicated by section line 5—5 in FIGURE 1.

FIGURE 6 is a sectional view taken through a plane indicated by section line 6—6 in FIGURE 5.

FIGURE 7 is an enlarged sectional view of the wheel axle support.

FIGURES 8 and 9 are enlarged partial sectional views as seen through planes indicated by section lines 8—8 and 9—9 respectively, in FIGURE 7.

Referring now to the drawings in detail, the sulky as illustrated in FIGURES 1, 2 and 3 is generally referred to by reference numeral 10. It will be observed, therefore, that the sulky includes a main frame generally referred to by reference numeral 12 which is rotatably supported adjacent a rear portion thereof by a pair of wheels 14.

The frame 12 is of the usual shape for racing sulkies and includes a rear end portion 16 forming a continuous curvature with the side portions 18 which terminate at the forward end of the frame 12 in tug holders 20 having plastic coverings 22 disposed thereabout whereby the sulky frame 12 may be harnessed to a trotter horse.

Disposed adjacent to the rear end portion 16 but spaced forwardly therefrom, is an inner support member 24 which may be made of tubular material. The inner support member 24 includes an upper portion 26, the ends of which may be welded to the sides 18 of the frame assembly 12 and also includes downwardly depending portions 28 as more clearly seen in FIGURE 3 which form with the upper portion 26, an arch configuration providing rigidity for the frame assembly 12 and also inner support for the wheel axles as will be hereafter described. Also, the inner support member in combination with the rear end portion 16 of the frame 12 constitute a support for the seat which is generally referred to by reference numeral 30.

Referring therefore to FIGURES 1 and 4 in particular, it will be observed that projecting lugs 32 and 34 are respectively welded to the upper portion 26 of the inner support member 24 and the rear end portion 16 of the frame 12 in longitudinal centered alignment with respect to the sulky frame 12. The seat 30 which is formed by a frame 36 and wire mesh seat portion 38 rests upon the lugs 32 and 34 and may be welded thereto for securely anchoring the seat 30 on the sulky frame. The occupant of the sulky when seated on the seat 30 will accordingly require support for the feet. A pair of generally U-shaped stirrup members 40 as more clearly seen in FIGURE 1 are therefore provided and are adjustably mounted on the inside of the side portions 18 of the sulky frame 12. Referring therefore to FIGURES 5 and 6 in addition to FIGURE 1, it will be observed that the inside of the side portions 18 of the sulky frame 12.

Referring therefore ot FIGURES 5 and 6 in addition to FIGURE 1, it will be observed that the inside of the side portions 18 of the frame 12 have welded thereto forwardly of the inner support member 24, a pair of adjusting bar members 42. The bar members have a plurality of keyhole-shaped slots 44 therein by means of which enlarged heads 46 formed on the forward and rear ends of the stirrup members 40 may be inserted into the slots 44 and thereby locked in adjusted position on the inside of the side portions 18 of the sulky frame 12.

It will be observed from FIGURES 1 and 3, that a pair of outside support bars or tubular members 48 are connected to the main frame 12 in alignment with the inner support member 24. The outside support members 48 depend downwardly from the frame 12 terminating just above the axis of the sulky wheels 14. Also connected to the rear portion 16 of the frame 12 are a pair of protective tubular members 50 which are curved downwardly, and laterally of their upper ends and then forwardly terminating adjacent to the lower ends of the outside support members 48. Also connected to the side portions 18 of the main frame 12 are a pair of additional support members 52 which extend downwardly from the main frame 12 and rearwardly from the upper ends to lower ends terminating adjacent to the lower ends of the outside support members 48 and the protective tubular members 50.

Referring therefore to FIGURES 7 and 8 in particular, it will be observed that a gusset plate member 54 interconnects the lower terminal ends of the tubular members 48, 50 and 52. The members 48, 50 and 52 thereby form a rigid support with respect to the frame 12 for the wheel axle 56 which extends through the gusset plate member 54. The wheel axle 56 is supported on the inside of the wheel 14 by a gusset plate member 58 which is connected as by welding to the lower ends of the depending portions 28 of the inner support member 24 as more clearly seen in FIGURES 7 and 9.

In addition to the rigid support provided for the wheel axles, the curvature of the protective bar members 50 as more clearly seen in FIGURE 3, is such that the descending hoof of an approaching trotter horse which would tend to damage the wheel 14 would be deflected laterally away from the wheel. Also, a rising hoof of an approaching horse will also be deflected by the protective bar 50 laterally inwardly away from the wheel 14. It will therefore be apparent, that a considerable measure of protection is afforded for the sulky wheel 14 from the hoof of horses approaching the sulky from the rear.

Referring now to FIGURES 1 and 2 in particular, it will be observed that the lower terminal ends of the protective bar members 50 form a continuous curvature with the additional support member 52, to not only provide in combination with the outside support member 48, support for the wheel axle, but also protection for the sulky wheels from the outside thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a racing sulky, a frame having laterally spaced side portions interconnected by a rear portion, an inner support member disposed in forwardly spaced relation to the rear portion of the frame, a pair of outer support members secured to the side portions of the frame in laterally spaced relation to the inner support member, a pair of aligned axles mounted between the outer support members and the inner support member in vertically spaced relation below the frame, a pair of wheels rotatably mounted by said axles extending rearwardly beyond the rear portion of the frame, a seat supported between the rear portion and the inner support member, a pair of protective bars interconnecting the outer support members with the frame extending diagonally between the axles and the rear portion of the frame and rearwardly from the axles beyond the wheels, said protective bars having curvatures operative to laterally deflect hoofs of horses approaching the wheels from any direction.

2. The combination of claim 1, including a pair of bracing members interconnected with the outer support members and the side portions of the frame extending forwardly from the axles, a pair of stirrups disposed laterally inwardly relative to the wheels and means mounting the stirrups on the side portions of the frame where the bracing members are interconnected therewith.

References Cited in the file of this patent

UNITED STATES PATENTS

| 563,364 | Engels | July 7, 1896 |
| 643,728 | Payne | Feb. 20, 1900 |
| 698,272 | Glover | Apr. 22, 1902 |

FOREIGN PATENTS

| 142,286 | Australia | July 17, 1951 |
| 429,216 | Italy | Jan. 19, 1948 |